United States Patent [19]

Berton et al.

[11] 4,312,758

[45] Jan. 26, 1982

[54] EFFLUENT TREATMENT PROCESS

[75] Inventors: Yves Berton, Le puy Sainte Peparade; Pierre Chauvet, Manosque, both of France

[73] Assignee: Commissariat a l'Energie Atomique, Paris, France

[21] Appl. No.: 157,786

[22] Filed: Jun. 9, 1980

[30] Foreign Application Priority Data

Jun. 14, 1979 [FR] France ................................ 79 15273

[51] Int. Cl.[3] ................................................ C02F 1/52

[52] U.S. Cl. .................................... 210/709; 210/719; 210/720; 210/724; 210/726; 252/631

[58] Field of Search ............... 210/709, 719, 720, 721, 210/722, 724, 726, 738, 199, 205, 206; 252/301.1 W

[56] References Cited

U.S. PATENT DOCUMENTS

| | | | |
|---|---|---|---|
| 2,105,835 | 1/1938 | Krause | 210/759 |
| 3,013,978 | 12/1961 | Rosinski | 252/301.1 W |
| 3,716,485 | 2/1973 | Robertson | 210/719 |
| 3,873,362 | 3/1975 | Mihram | 252/301.1 W |
| 4,049,545 | 9/1977 | Horvath | 210/724 |

FOREIGN PATENT DOCUMENTS

| | | | |
|---|---|---|---|
| 724706 | 12/1965 | Canada | 210/726 |
| 2613128 | 9/1977 | Fed. Rep. of Germany | 252/301.1 W |
| 2723025 | 11/1978 | Fed. Rep. of Germany | 252/301.1 W |
| 2724954 | 12/1978 | Fed. Rep. of Germany | 252/301.1 W |
| 2067743 | 7/1971 | France | 252/301.1 W |
| 48-11280 | 4/1973 | Japan | 252/301.1 W |
| 49-116854 | 8/1974 | Japan | 210/721 |
| 51-32057 | 3/1976 | Japan | 210/759 |

*Primary Examiner*—Ernest G. Therkorn

*Attorney, Agent, or Firm*—Michael N. Meller

[57] ABSTRACT

Process for the treatment of decontamination effluents, more particularly the components of nuclear reactors, of the type containing in solution permanganate, phosphate and sulphate ions and active manganese, chrome and cobalt ions, wherein it comprises the successive stages of reducing the permanganate ions by adding hydrogen peroxide, alkalization to a pH equal to or above 12, separation of the precipitate formed and final acidification of the residual liquid phase to bring its pH to a value compatible with discharge into the environment.

The invention also relates to an apparatus for performing the above process.

3 Claims, 3 Drawing Figures

EFFLUENT TREATMENT PROCESS

BACKGROUND OF THE INVENTION

Figure 1:
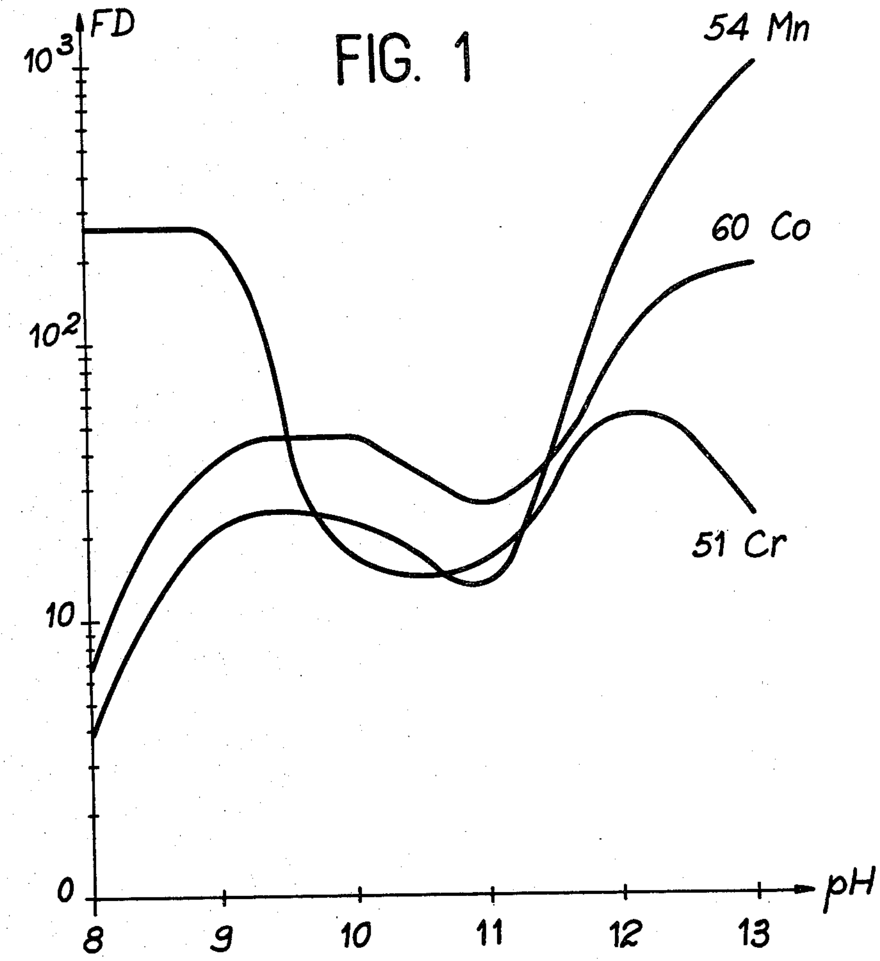

The present invention relates to a process for treating effluents obtained from the decontamination of components of nuclear reactors, such as those resulting from the decontamination of stainless steel members which have spent a certain time in contact with the cooling fluid of a nuclear reactor, whereby said fluid can be constituted by water or liquid sodium.

It is known that in a nuclear reactor of the latter type the convection movements which occur within the sodium mass lead to the transfer of certain radioactive atoms transported by the liquid metal coolant and contaminate certain components of the reactor. One of the most frequently encountered radionuclides among those responsible for this contamination is manganese 54 formed in the reactor core by the reaction $^{54}Fe$ (n, p)-$^{54}Mn$.

In order to decontaminate the stainless steel members chemical agents in solution are used which make it possible to dissolve the active products deposited in this way on the members. Various chemical agents are used, but they normally contain acids and/or bases in aqueous solution and are often completed by potassium permanganate, which acts as the oxidising agent.

Conventionally the composition of such a decontamination effluent is as follows:

acidity: 1.5 to 3 N
$Na^+$: 5 to 10 g/l
$K^+$: 0.2 to 0.5 g/l
PO43—: 20 to 80 g/l
SO42—: 5 to 10 g/l
$MnO_4^-$: 0.5 to 1 g/l The radioactivity, mainly due to the activation products: $^{54}Mn$ —$^{60}Co$ —$^{51}Cr$ is approximately $10^{-2}$ to $10^{-1}$ Ci/m$^3$.

The chemical treatment of such an effluent aims on the one hand at bringing about decontamination, consisting of passing most of the radioactivity into slurry precipitates which are subsequently stored, whilst the liquid phase is discharged in the ordinary way and on the other hand obtaining a good concentration of the slurries formed during the effluent treatment, i.e. a small slurry volume compared with the initial volume of the liquid effluent to be treated. It is pointed out that in the conventional manner the decontamination quality is measured by using the decontamination factor (abbreviated to DF) which, for each radionuclide present, is expressed by the ratio between the activities of this radionuclide in the solution before and after effluent treatment. Moreover, for each of the envisaged radionuclides safety standards define in activity, i.e. in numbers of disintegrations per unit of volume and per unit of time, the maximum permissible concentration for the population (abbreviated to M.P.C.P.) in the drinking water. Finally, there can be pH problems in that the discharged water must not have too serious an influence on the biological environment due to their acidity or alkalinity.

BRIEF SUMMARY OF THE INVENTION

The present invention relates to a process for treating decontamination effluents making it possible to obtain both adequate decontamination factors, a good concentration of the slurries to be stored and the discharge of a liquid phase which complies with legal requirements.

The present treatment process applies to effluents of the type containing in solution permanganate, phosphate and sulphate ions and radioactive manganese, chrome and cobalt ions, wherein it comprises the successive stages of reducing the permanganate ions by adding hydrogen peroxide, alkalisation to a pH equal to or greater than 12, separation of the precipitate and final acidification of the remaining liquid phase to bring its pH to a value compatible with its discharge into the environment.

According to an important feature of the present invention the decontamination factors are improved by adding to the effluent a nickel or ferrous salt after the addition of hydrogen peroxide and before alkalization. In preferred manner the nickel salt can be either $NiSO_4$ or $Ni(NO_3)_2$. $6H_2O$, whereas the ferrous salt used most frequently is $FeSO_4$ $7H_2O$.

According to another important feature of the invention, the permanganate ions are reduced by hydrogen peroxide, generally 100 volumes, which is added to the liquid phase until there is an adjustment of the oxidation-reduction potential to a value close to 550 mV relative to a calomel electrode.

In most cases, it is advantageous to separate the slurry precipitate within the liquid phase by centrifuging.

The present invention also relates to an apparatus for performing this process.

The apparatus for performing this process is characterized in that it comprises a first tank communicating with a second tank, the two tanks being provided with stirring means, means for introducing the liquid effluent to be treated and hydrogen peroxide into the said first tank, means for adjusting to the desired value the oxidation-reduction potential of the effluent present in the first tank, means for introducing a nickel salt and an alkaline solution into the second tank, means for adjusting to the desired value the pH of the effluent in the second tank, means for separating the precipitate formed from the effluent and for bringing it into a third tank equipped with stirring means, means for introducing an acid solution into the third tank and means for adjusting the pH of the effluent to the desired value.

This apparatus is characterized by the fact that the means for separating the precipitate formed are constituted by a centrifuge and a filter.

DESCRIPTION OF THE DRAWINGS AND PREFERRED EMBODIMENTS

The invention is described in greater detail hereinafter relative to three performance examples of the process, described with reference to the attached FIGS. 1 to 3, wherein show:

FIG. 1—variations in the decontamination factor as a function of the pH of the solution.

Figure 2:
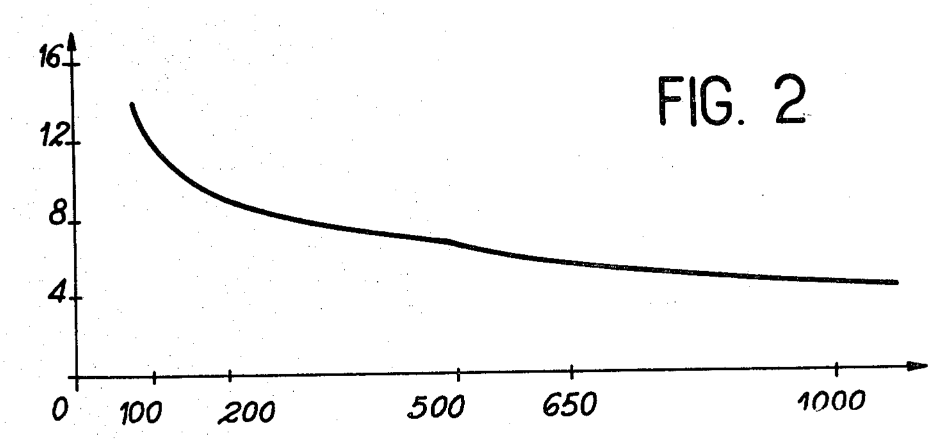

FIG. 2—the volume of the slurries as a percentage compared with the initial volume of effluent as a function of the field applied by the centrifuge, expressed as accelerations of the gravity g.

Figure 3:
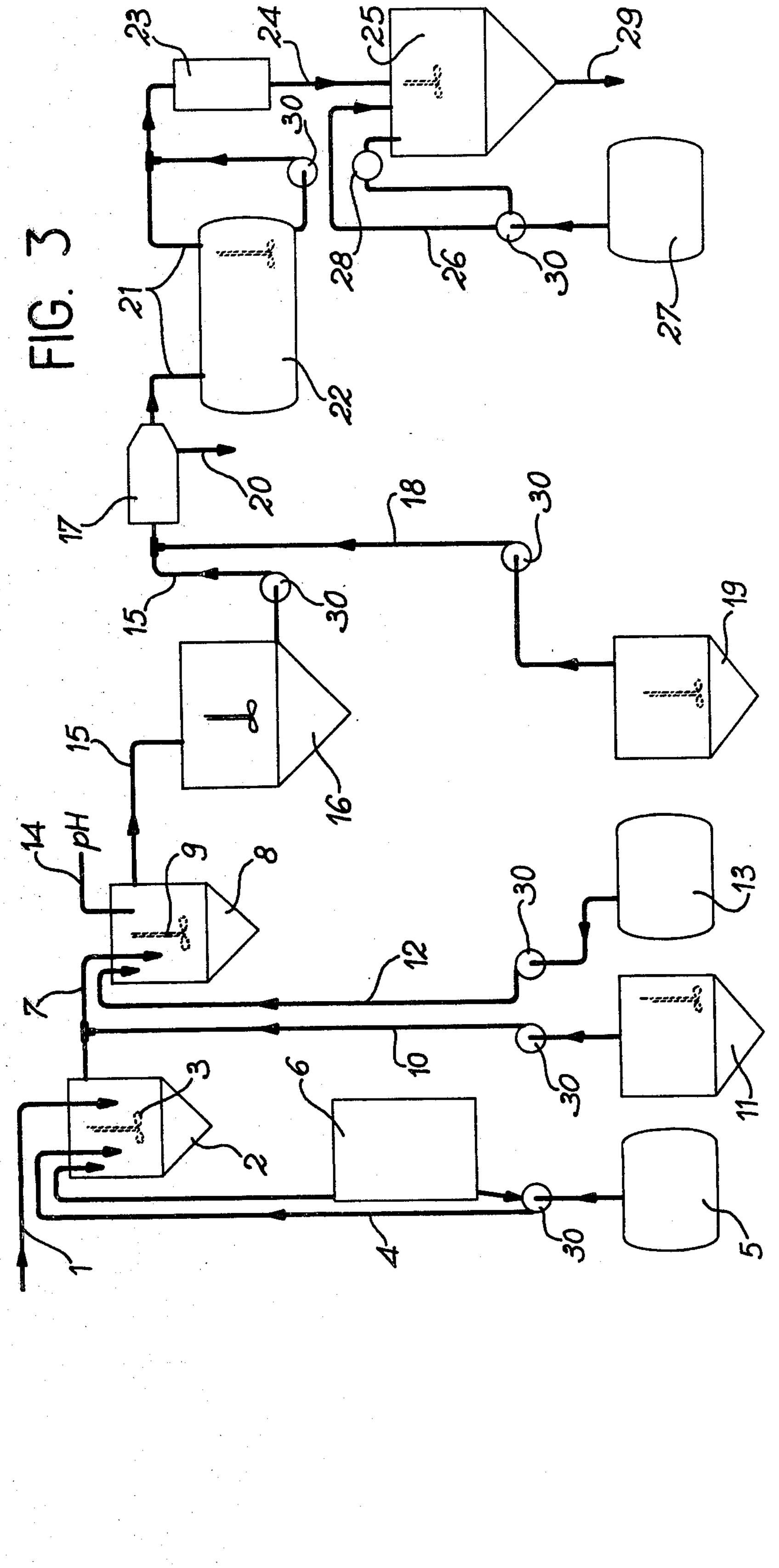

FIG. 3—an apparatus for performing the effluent treatment process according to the invention.

EXAMPLE 1

This example gives the results of treatment by the process according to the invention of an effluent having the following composition:

acidity: 2.1 N $KMnO_4$: 0.6 g/l
$PO_4^{3-}$: 64.6 g/l
$SO_4^{2-}$: 3.7 g/l
$^{54}Mn$: $435\times10^{-6}$ $Ci/m^3$
$^{51}Cr$: $15\times10^{-6}$ $Ci/m^3$
$^{60}Co$: $21\times10^{-6}$ $Ci/^3$ The hydrogen peroxide added is 100 volume hydrogen peroxide and the quantity used was 1.1 ml/l of solution. Alkalization to a pH above 12 was obtained by means of soda in a quantity equal to 85 g/l of solution.

Two treatment processes were performed, one with nickel and the other without nickel. Nickel was introduced in the form of 0.3 g/l nickel sulphate solution ($NiSO_4$). The following table gives the activities in micro-ciries/$m^3$ before and after treatment for each of the three radionuclides $^{54}Mn$, $^{60}Co$, and $^{51}Cr$. It is readily apparent that good decontamination factors are obtained with the treatment using hydrogen peroxide plus soda, but these factors are significantly improved on adding the nickel salt. The decontamination factor obtained is then above 430 for manganese, above 15 for chrome and equal to 10 for cobalt.

| | $^{54}Mn$ $1.10^{-6}$ Ci/m | | | $^{60}Co$ $1.10^{-6}$ $Ci/m^3$ | | | $^{51}Cr$ $1.10^{-6}$ $Ci/m^3$ | | |
|---|---|---|---|---|---|---|---|---|---|
| | before treat. | after treat. | D.F. | before treat. | after treat. | D.F. | before treat. | after treat. | D.F. |
| $H_2O_2$(100 volumes)1.1 ml/l | 435 | | | 21 | | | 15 | | |
| NaOH ad pH = 13(85 g/l) | 435 | 4 | 108 | 21 | 10 | 2.1 | 15 | 10 | 1.5 |
| $H_2O_2$(100 volumes)1.1 ml/l | | | | | | | | | |
| $Ni^{2+}$ (sulphate) 0.3 g/l | | | | | | | | | |
| NaOH ad pH = 13(85 g/l) | 435 | <1 | >430 | 21 | approx. 2 | 10 | 15 | <1 | >15 |

EXAMPLE 2

The second performance example for the treatment process according to the invention relates to an effluent solution whose initial activity (indicated hereinafter) is much higher than the activities of the effluent in the previous example. The following table gives the results obtained with regard to the decontamination factor, which are therefore much more spectacular. This effluent has the following chemical characteristics:

Acidity: 2.23 N
$Na^+$: 4.6 g/l
$PO_4^{3-}$: 73.7 g/l
$SO_4^{2-}$: 4.9 g/l
$MnO_4$: 0.6 g/l In this example the effluent solution was treated by adding 100 volume hydrogen peroxide in a quantity of 1.15 ml/l of solution in order to reduce the permanganate ions. 0.3 g/l of solution of nickel ions was then added in sulphate form, followed by the alkalization of the medium by adding 80 to 95 g/l of soda to obtain a pH equal to or above 12.

The decontamination factors given in the following table were obtained and in the table the activities are expressed in micro-curies/$m^3$.

| | Initial Activity $10^{-6}$ $Ci/m^3$ | D.F. | Residual Activity $10^{-6}$ $Ci/m^3$ |
|---|---|---|---|
| $^{54}Mn$ | 160,000 | 1000 | 160 |
| $^{60}Co$ | 1,000 | 200 | 5 |
| $^{51}Cr$ | 18,000 | 20 | 900 |

EXAMPLE 3

This example relates to comparative experiments carried out with nickel and other metallic cations such as iron, copper, calcium or cobalt in order to compare the decontamination factors obtained. The following table clearly shows the superiority of nickel compared with the other cations. In all the experiments 1.5 ml of hydrogen peroxide of 100 volumes was introduced per liter of effluent and after adding the metallic salt soda was added to give a pH of 12. In the following table a column headed "total gamma" was added to the specific decontamination factor of each of the previous three radionuclides and this corresponds to the overall decontamination of all the gamma emitters considered in an overall manner.

| Cation | Mg/l Addition | Decontamination factors $\gamma$total | $^{54}Mn$ | $^{60}Co$ | $^{51}Cr$ |
|---|---|---|---|---|---|
| | | 230 | 240 | 60 | 7 |
| $Fe^{3+}$ | 300 | 22 | 24 | 7 | 7 |
| $Cu^{2+}$ | 300 | 21 | 24 | 27 | 9 |
| $Ca^{2+}$ | 300 | 100 | 120 | 25 | 30 |
| $Co^{2+}$ | 300 | 25 | 30 | 50 | 30 |
| $Ni^{2+}$ | 100 | 400 | 420 | 150 | 5 |
| $Ni^{2+}$ | 200 | 710 | 750 | 150 | 11 |
| $Ni^{2+}$ | 300 | 900 | 920 | 200 | 23 |
| $Ni^{2+}$ | 400 | 1400 | 1500 | 200 | 25 |

Reference can advantageously be made to FIG. 1 in connection with the influence of the pH to which the solution is brought after the permanganate ion reduction stage and the addition of a metallic salt. Under experimental conditions corresponding to the penultimate line of the above table (300 mg/l of nickel ions) FIG. 1 shows the influence of the pH of the solution, plotted on the abcissa relative to the decontamination factor obtained for each of the three radionuclides contained in the initial effluent, namely $^{51}Cr$, $^{60}Co$ and $^{54}Mn$. It is apparent from the graph that the maximum effect of the pH on the decontamination is obtained for a pH value equal to or above 12.

The slurries formed by precipitation during chemical treatment are generally very finely divided and, in view of the high salinity of the treated effluent, they do not settle. Under these conditions to obtain a true separation of the liquid and solid phases it is necessary to use a filtering or preferable centrifuging operation, because the latter method is much more efficient due to the low cohesion of the slurries. A complementary filtration makes it possible to eliminate fine particles which may have remained in suspension after centrifuging.

The pH at the end of treatment (12) is lowered to between pH=5.5 and 8.5 so that the effluent can be discharged into the receiving medium. This pH correction leads to a nitric acid addition of approximately 75

$kg/m^3$ (13 N $HNO_3$) or 35 $kg/m^3$ of sulphuric acid (36 N $H_2SO_4$).

FIG. 2 shows the curve representing the evolution of the apparent volume of the slurries as a percentage compared with the initial effluent volume as a function of the centrifugal field applied, said field being expressed in acceleration units g of the earth's gravity. The following table gives the results of FIG. 2 with the apparent volume of the compressed slurries and their residual moisture content as a function of the centrifugal field applied and the time in minutes during which this field was applied. It is apparent that under optimum treatment conditions the dehydrated slurries have a volume of 30 ml/l of solution with an 86% moisture content.

| Centrifuging conditions | | Slurry characteristics | |
|---|---|---|---|
| No. of "g" | Time - min | % by volume | Moisture % by volume |
| 650 | 2 | 5.4 | 88 |
| 650 | 10 | 3.4 | 86 |
| 1000 | 2 | 4.4 | 87 |
| 1000 | 10 | 3.0 | 86 |

With reference to FIG. 3 the diagram of an installation for treating decontamination effluents according to the invention is described.

In the drawing the effluents are supplied by a pipe 1 to a first tank 2 equipped with a stirrer 3. By means of pipe 4 the hydrogen peroxide contained in a storage reservoir 5 is injected into tank 2, whilst controlling by means of a per se known device 6 the oxidation-reduction potential of the solution in order to bring it to the desired value, which is generally close to 550 mV compared with a calomel electrode. The effluents generally spend approximately 30 minutes in tank 2.

A pipe 7 then passes the effluents into a second tank 8, which is also equipped with a stirrer 9 and into which is introduced by means of pipe 10 the nickel sulphate stored in container 11 and by pipe 12 the soda stored in container 13 in order to bring the pH to a value equal to or above 12, which is checked by means of probe 14. The effluent then passes through pipe 15 into a buffer tank 16 before passing into centrifuge 17 where the slurries are separated by suction filtering. To facilitate the separation it may be advantageous to add to the solution a flocculating agent which is introduced by pipe 18 coming from a storage reservoir 19. The slurries leave centrifuge 17 at 20 and the liquid phase, from which the slurries have been separated, then passes through pipe 21 into a second buffer tank 22. At this stage the liquid effluent must still be filtered through filter 23 to eliminate fine particles which may not have been completely separated by centrifuging. The thus treated liquid phase is then supplied by pipe 24 to a further tank 25, equipped with a stirrer and into which is introduced by means of a pipe 26 the quantity of nitric or sulphuric acid from a storage container 27 necessary for adjusting the pH to a value compatible with Government regulations and generally approximately 7, prior to discharge into the environment. The pH value is checked by a probe 28 branched from tank 25. The final discharge can then take place by gravity at the bottom 29 of tank 25.

Obviously a certain number of pumps are required for maintaining the liquids in movement whilst passing through the different stages of the installation and these pumps are diagrammatically indicated by the reference numeral 30.

What is claimed is:

1. A process for decontaminating the components of nuclear reactors by treating decontamination effluents, of the type containing in solution permanganate, phosphate and sulphate ions, as well as radio active manganeses, chrome and cobalt ions, comprising the successive steps of reducing the permanganate ions by adding hydrogen peroxide, and adding to the effluent a nickel salt selected from the group consisting of $NiSO_4$ and the nitrate $(Ni(NO_3)_2.6H_2O$, raising the alkalinity to a pH of 12 or above, separating the resulting precipitate and final acidification of the residual liquid phase to approximately a neutral pH to make it possible to discharge into the environment.

2. A process for the treatment of effluents according to claim 1, wherein after the final reduction stage by hydrogen peroxide $FeSO_4.7H_2O$ is added to the effluent.

3. A process for the treatment of effluents according to claim 1, wherein hydrogen peroxide is added until the oxidation-reduction potential is adjusted to a value of approximately 550 mV, as compared to a calomel electrode.

* * * * *